United States Patent

[11] 3,540,377

| [72] | Inventors | Joseph O. Juliano<br>Cedar Grove, New Jersey and<br>Donald A. Bednar, Champaign, Illinois |
|---|---|---|
| [21] | Appl. No. | 766,091 |
| [22] | Filed | Oct. 9, 1968 |
| [45] | Patented | Nov. 17, 1970 |
| [73] | Assignee | Said Bednar assignor to The Magnavox Company,<br>Fort Wayne, Indiana<br>a corporation of Delaware |

[54] POWER SUPPLY FOR ELECTRICALLY ACTUATED FUSE
8 Claims, 8 Drawing Figs.

[52] U.S. Cl. .................................................. 102/70.2
[51] Int. Cl. ........................................................ F42c 11/02,
F42c 11/06, F42c 15/40

[50] Field of Search............................................. 102/70.2g

[56] References Cited
UNITED STATES PATENTS

| 2,987,998 | 6/1961 | Booth................................ | 102/70.2 |
| 3,359,904 | 12/1967 | Nerheim.......................... | 102/70.2 |
| 3,106,161 | 10/1963 | Wallbaum et al.............. | 102/70.2 |
| 3,101,054 | 8/1963 | Stevenson et al............. | 102/70.2 |
| 3,200,749 | 8/1965 | Downs............................ | 102/70.2 |
| 3,209,693 | 10/1965 | Carr................................. | 102/70.2(G) |

Primary Examiner—Benjamin A. Borchelt
Assistant Examiner—Thomas H. Webb
Attorney—Richard L. Seeger ABSTRACT: Power supply for an electrically actuated fuse for an explosive charge in which piezoelectric crystal means are subjected to pressure to develop a voltage and a circuit including a spark gap connects the power supply with the fuse.

Patented Nov. 17, 1970
3,540,377
Sheet 1 of 2
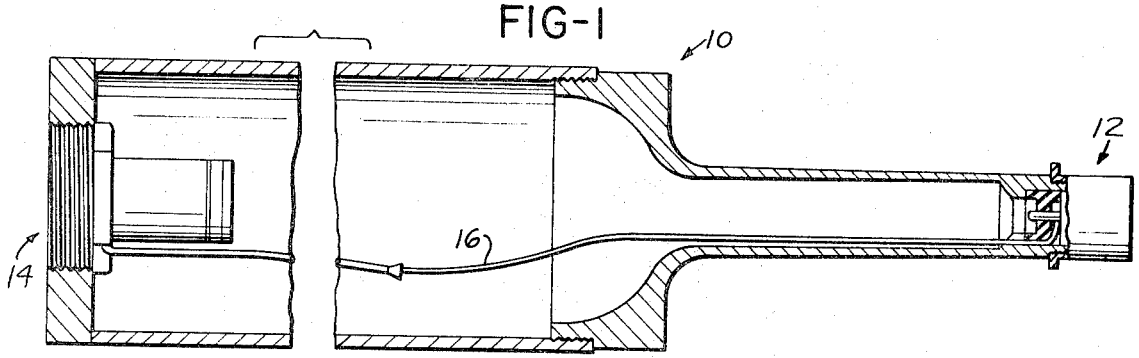
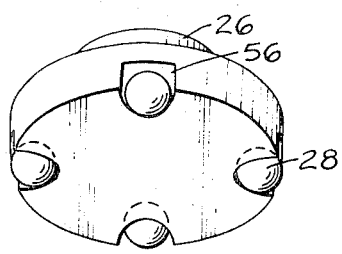
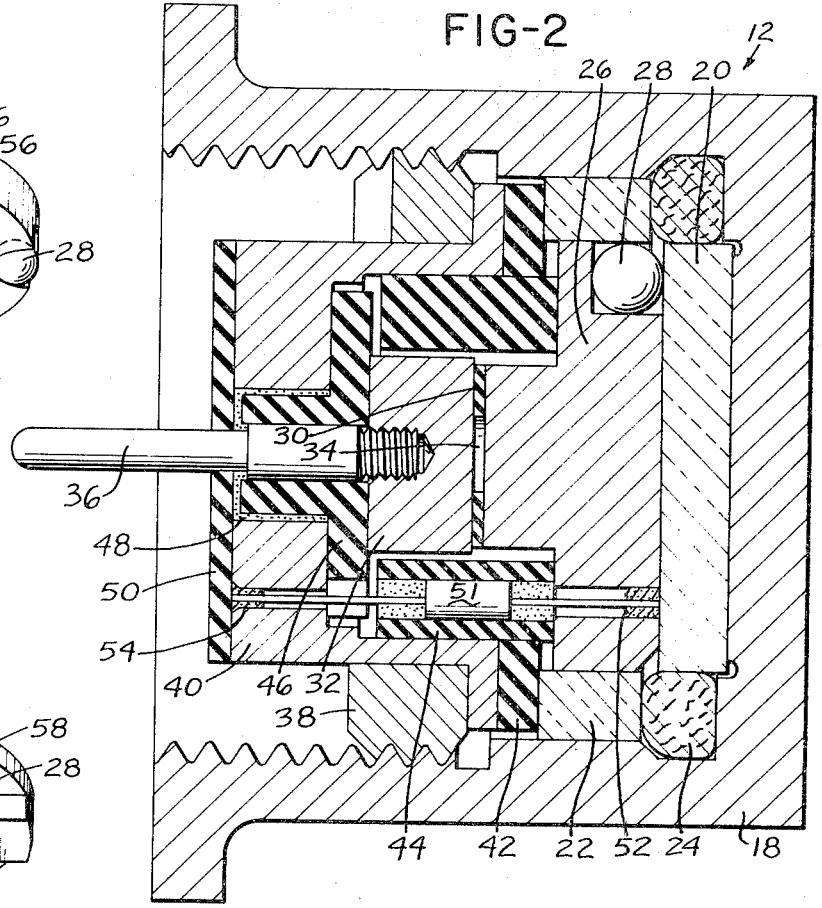
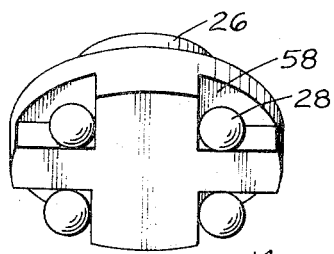
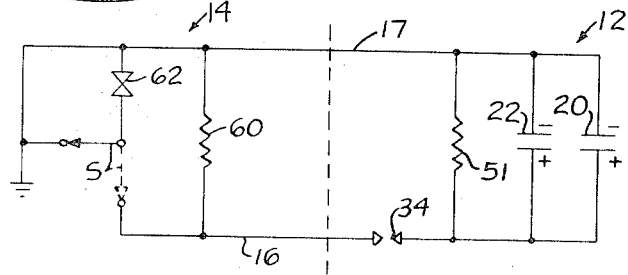

Patented Nov. 17, 1970

POWER SUPPLY FOR ELECTRICALLY ACTUATED FUSE

The present invention relates to a power supply for an electrically actuated fuse and is particularly concerned with a power supply of the aforesaid nature which does not include batteries or other power storage means.

Electrically actuated fuses for explosive devices, such as artillery projectiles and the like, are known, but heretofore such fuses have generally utilized a battery and a switching arrangement for connecting the battery to the fuse with the switching arrangement being sensitive to impact for closing, either instantaneously or upon a predetermined time delay.

While batteries are, in general, a reliable source of electrical energy, they are expensive and fairly heavy and tend to deteriorate and are also sensitive to adverse ambient conditions.

With the foregoing in mind, the present invention proposes the provision of a power arrangement for supplying electrical energy to an electrically actuated fuse for an explosive device, such as an artillery projectile, in which no batteries are required and wherein the power supply is insensitive to ambient conditions and does not deteriorate even though it remains idle or in storage for an indefinite period of time.

A particular object of the present invention is the provision of a power supply of the nature referred to which is relatively inexpensive and which is completely reliable under all conditions of operation.

A further object of the present invention is the provision of a power supply arrangement of the nature referred to which can be mounted in any location within an artillery projectile of which it forms a part.

Still another object of this invention is the provision of a power supply of the nature referred to in which the power supply is sensitive not only to direct impact of the projectile but also to glancing impact of the projectile for generating power for actuating the fuse.

Still another object of this invention is the provision of a power supply for an electric fuse in which the power supply is completely safe to use under all conditions of operation and will not by accident cause actuation of the fuse.

The foregoing objects of the present invention, as well as still other objects and advantages thereof, will become more apparent upon reference to the following detailed description taken in connection with the accompanying drawings, in which:

FIG. 1 is a schematic longitudinal sectional view through a projectile embodying an electrically actuated fuse and a power supply according to the present invention;

FIG. 2 is a longitudinal sectional view showing the power supply and drawn at enlarged scale;

FIGS. 3 and 4 show variations of the ram arrangement by means of which the power is generated in the power supply under certain conditions, such as upon impact of the projectile with a target;

FIG. 5 is a schematic view showing an equivalent electrical circuit for the power supply and fuse;

SUMMARY OF THE INVENTION

Figure 7:
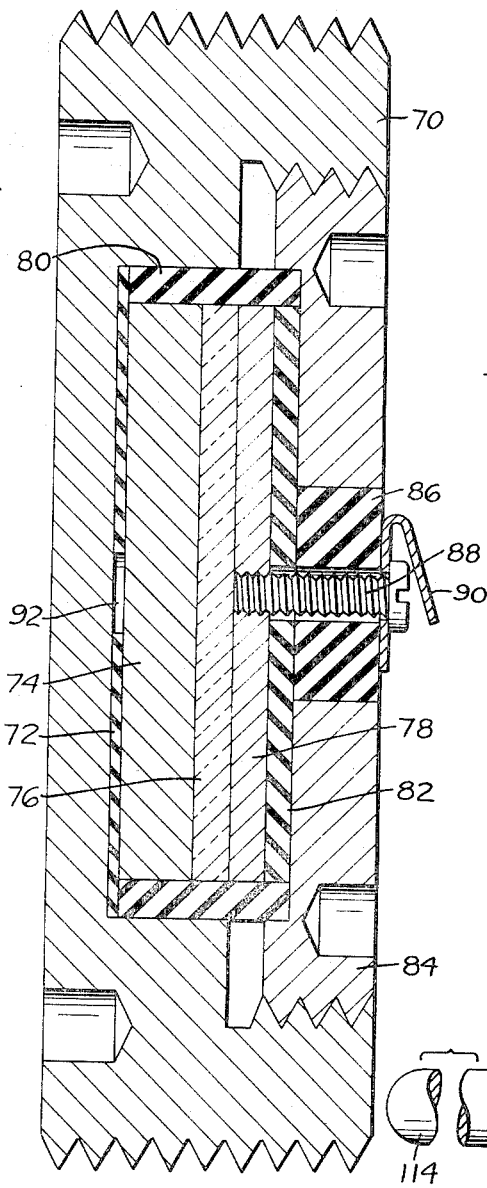
FIG. 7 is a longitudinal section similar to FIG. 2, but showing a modified arrangement of the power supply.

The present invention proposes a power supply for an electrically actuated fuse for an explosive charge in which one or more piezoelectric crystals, or piezoids, are subjected to pressure under a certain condition, such as acceleration of a projectile in which the power supply and fuse are mounted. An electric circuit connects the power supply with the fuse and contains a spark gap to insure that only high voltages will be effective for firing the fuse. The pressure applying means preferably exerts point pressure on the piezoid means to produce high voltages in a reliable manner.

Referring to the drawings somewhat more in detail, in FIG. 1, 10 generally indicates an artillery projectile of the explosive type. No particular artillery projectile is shown but it will be understood that the projectile comprises a metal case containing an explosive charge which is adapted to be detonated by a fuse which, in turn, is actuated upon impact of the projectile with a target.

In FIG. 1, the power supply is generally indicated at 12 and the fuse is generally indicated at 14. Details of construction of the projectile and the powder charge therein are conventional and are not shown. The power supply is connected with the fuse via a wire 16 which forms one side of the interconnecting circuit and the other side of the circuit consists of the metal of the projectile itself.

Turning now to FIG. 2, this is an enlarged longitudinal section of the power supply generally indicated at 12 in FIG. 1. In FIG. 2 it will be seen that the power supply comprises a housing or cuplike cap member 18 having mounted therein a disclike piezoelectric crystal, or piezoid, 20 and a ringlike piezoid 22. Preformed packing, which may be rubber or a rubberlike material, is indicated at 24 and surrounds the periphery of disclike piezoid 20, and is also disposed at one end of the ringlike piezoid 22.

A ram 26 is disposed inside ringlike piezoid 22 and has one end face engaging one face of disclike piezoid 20. Ram 26 has a plurality of peripheral notches formed therein in which metal balls 28 are disposed so that they contact the inside of ringlike piezoid 22 and the adjacent axial face of disclike piezoid 20.

An insulating washer 30 engages the face of ram 26 opposite disclike piezoid 20 and a block of metal 32 engages the opposite side of washer 30. The aperture in the washer defines a spark gap at 34 for a purpose to be defined hereinafter. A connector pin 36 is threaded into metal block 32 and projects from the power unit for connection to the aforementioned wire 16.

The assembly is retained in assembled relation by a ring nut 38 threaded into the open end of housing 18 and engaging a radial flange on a metal body 40. The side of the flange of body 40 opposite nut 38 engages an insulating ring 42 that holds ringlike piezoid 22 in position. An insulating cylinder 44 is disposed inside metal body 40 and also extends through insulating ring 42 and engages one side of ram 26. A further insulating member 46 surrounds pin 36 and engages metal block 32 on one side and is retained inside the metal body 40 by means of a flange engaging the inner end of metal body 40. Advantageously, insulating member 46 may be retained in metal body 40 as by adhesive 48. An insulating disc 50 mounted on the outer end of metal body 40 is also provided.

According to the present invention, small voltages that may be developed on the piezoids are bled off therefrom by a resistor 51 having one terminal soldered to ram 26 at 52 and its other terminal soldered to metal body 40 at 54. Resistor 51 effectively shunts across the piezoids 20 and 22.

The described construction provides that upon impact of the projectile with a target surface, either directly or obliquely, one or both of the piezoids 20, 22 will be subjected to pressure and a voltage will be developed thereon between the opposite faces and this voltage will be impressed across the spark gap 34. At a predetermined level, this voltage will arc across the spark gap, thus supplying electrical energy to fuse 14, firing the fuse and causing detonation of the projectile.

The illustrated arrangement is of particular merit in that the balls 28, of which there are several, will provide for intense pressure on the piezoids so that a high voltage is developed thereacross, thus causing reliable actuation of fuse 14. Minor voltages developed across one or the other of the piezoids will readily bleed off through resistor 51. Such minor voltages might be developed from bumping of the projectile during handling, for example. No voltages sufficiently large to arc across the spark gap 34 however can ever be developed in this manner. Furthermore, it is customary with projectiles of the nature disclosed to include an arming switch so that, prior to placing the projectile in a weapon, the arming switch is in open position and no possibility exists for the fuse 14 to be actuated. The provision of resistor 51, however, prevents the accumulation of a charge on the piezoids so that when the projectile is ready to be placed in a gun, there will be no charge on the piezoids and closing of the arming switch will not be in any way dangerous.

FIGS. 3 and 4 show how the ram 26 could have radial notches 56 to receive the balls 28, or how it could be provided with angular notches 58 for receiving the balls 28. Other arrangements for containing the balls so that they will exert substantially point pressure on the piezoids will occur to those skilled in the art.

Turning now to FIG. 5, there is schematically illustrated a substantially equivalent circuit for the power supply and fuse. In FIG. 5, the power supply 12 is indicated toward the right, while the fuse 14 is indicated toward the left. The power supply embodies the disclike piezoid 20 which is shown as a condenser, and the ringlike piezoid 22 which is shown as another condenser parallel with the condenser indicating the disclike piezoid. The aforementioned resistor 51 is connected in shunting relation to the two piezoids as previously described.

The aforementioned spark gap 34 is illustrated in FIG. 5 and is disposed in wire 16 which forms one side of the electric circuit. The other side of the electric circuit, indicated by numeral 17, is formed by the frame or case of the projectile.

At the fuse end of the projectile there is provided a bleeder resistor 60 which serves to maintain the fuse free of accumulated charges at all times, but offers sufficient resistance that a voltage which will arc across spark gap 34 will fire the fuse. The fuse includes an element 62 which will fire when the electric current is passed therethrough. Element 62 is in parallel with resistor 60 and in series with an arming switch S. Switch S is in its full line position to short out element 62 during transport of the projectile, and remains in this position until the projectile is ready to be placed in a gun.

When the projectile is to be fired, switch S is unlocked from its full line position and will thereafter close to its dotted line position only after the projectile has left the gun and has reached a position somewhere between the gun and the target. Switch S may be timer controlled or it may be operated by inertial forces or by centrifugal means. Such switches are known in connection with artillery devices and it will be understood that the switch closes into its dash-line position of FIG. 5 only when the projectile has undergone its initial acceleration in the gun barrel and has passed from the gun a predetermined distance and is in a condition of substantially zero acceleration.

Figure 6:
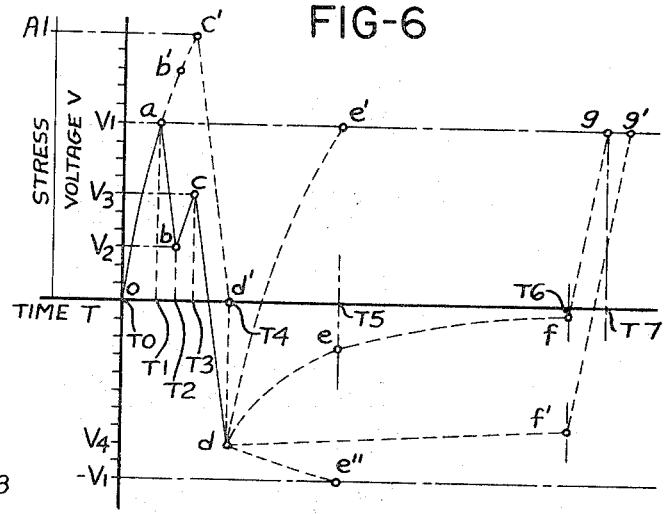
FIG. 6 is a graph showing voltage and stress plotted against time for a typical power supply according to the present invention in an artillery projectile.

Reference to FIG. 6 will serve to explain the manner in which the circuit of the present invention operates. In FIG. 6 the horizontal axis represents time, while the vertical axis represents the voltage developed by the piezoids and the stress on the piezoids. Time T0 is considered to be the moment the projectile is fired. The moment of impact of the projectile with a target is indicated at T6 with the moment at which the fuse 14 is actuated being indicated at T7. Intermediate the points T0 and T6 is a point marked T5 and this is the point in time at which the arming switch moves to its dashed line position of FIG. 5 and connects fuse element 62 in circuit with the piezoids so that the fuse will be sensitive to the voltages developed in the piezoids. Between point T0 and T5 the arming switch S is not in its dashed line position so that the voltage is developed in a piezoid when the projectile is being accelerated from the barrel of the gun from which it is fired are not effective for actuating the fuse.

With the foregoing comments in mind, reference to FIG. 6 is made as follows:

Setback acceleration when the projectile is fired from the gun causes stress on the piezoid means, generating a voltage, as shown by line $oa$. The magnitude of this voltage depends on the particular power supply design and, more specifically, on the orientation and loading of the piezoid means.

If the voltage reaches a value V1, sufficient for arcing across gap 34, the voltage decays to a value V2 at point $b$. The voltage does not decay completely to zero because: (1) The arcing is not a 100 percent efficient shorting system, and (2) Voltage generation proportional to the line $ab'$ continues during the period T1 to T2. A1, Depending upon the mechanical and electrical frequency characteristics of the system, the cycle $oab$ may occur more than once during the setback acceleration interval, or it may be that the voltage level V1 may not be reached at all. At the end of this acceleration interval, time T2, however, it is probable that the voltage is at a level V3, point $c$. The stress on the piezoid means, however, in the extreme case, namely, if voltage V1 has been exceeded and arcing across gap 34 has not occurred, is at a level Al, point $c'$. Relaxation at this stress at the end of the acceleration interval causes a proportional voltage of opposite polarity to be generated, as shown by the line $cd$, equal in magnitude to the theoretical line $c'$ $d'$, which would have been the net result had arcing at time T1 not occurred.

In one extreme case, from a safety viewpoint, then, the residual voltage appearing across the piezoid means at time T4, complete termination of setback acceleration, is equal to V4, point $d$, which is slightly less than V1 in magnitude, with opposite polarity. Although the power supply bleeder resistor R1 also causes a decay of the voltage generated during any cycle $oabcd$, the primary purpose of R1 is to provide a voltage decay rate compatible with the following:

1. Prevention of Premature Functioning

Prevent the residual voltage V4 from increasing to the critical value V1 or V4, as shown by lines $de'$ and $de''$, respectively, during the time interval T5 when arming switch S closes, to the time of impact T6.

2. Increase in Graze Functioning Reliability a. Decrease the residual voltage V4, at time T4, point $d$, to an insignificant value, point $f$, prior to graze impact, time T6, thereby eliminating the possibility that a positive pulse generated during graze must be of sufficient magnitude to negate the voltage V4, point $f'$, in addition to generating the +V1 voltage, point $g$, in order to achieve arcing across gap 34 and firing of fuse 14. The path $defg$ is desired, as opposed to path $df'$ $g'$.

b. Provide only an insignificant voltage decay during a graze generation interval, time T6 to T7.

Although an interaction of forces and components of forces may cause both of the piezoids (piezoelectric crystals) 20 and 22 to generate a voltage as a result of various types of projectile impacts, and in which case the respective energy generation is electrically complementary, the disclike piezoid 20 is primarily responsive to forces or components of forces which are parallel to the longitudinal axis of the projectile, such as are obtained during nose or shoulder impact, while the ringlike piezoid 22 is primarily responsive to forces or components of forces radial to the longitudinal axis of the projectile, such as obtained during graze impact.

Since the magnitude of the forces generated during typical graze impact may often be marginal relative to causing reliable functioning of the fuse, the spark gap control power supply increases graze functioning reliability due to its inherent sensitivity and responsiveness to both radial and axial forces. The spark gap control power supply further provides the following advantages and improvements over existing methods of providing electrical energy to fuses and other firing devices:

1. As opposed to other types of Control Power Supplies, the system of the present invention does not require that the electrical energy be generated by some initial set of dynamic firing conditions, or that the device have the ability to store the energy for a specified minimum length of time. As a result, the spark gap piezoelectric crystal power supply of the present invention has none of the parts necessary in other power supplies to rectify and store the charge generated. In addition, it does not require assembly in a controlled environment, low humidity, for example, or hermetic seals necessary to maintain a certain environment within the package to prevent excessive charge leakage.

2. The use of impact balls to stress the crystals provides increased output with the same relative piezoelectric crystal size and material. It has been found that increased output is attainable from a given crystal under a given load, when that load is transmitted to the crystal by the point source application of a ball. The number, type, arrangement and material of the balls may be varied to provide a wide latitude in design variation. Anyone or combination of these parameters may be varied in combination with one or more variety of different shape crystals to attain greater or lesser output, sensitivity or response.

3. The use of a disclike and/or ringlike piezoelectric crystal provides the system with the additional flexibility of being sensitive to forces in any direction. The power supply containing both a ringlike and a disclike crystal, coupled with the presence of the impact balls provides a multidirectionally responsive system. The use of either the ringlike or the disclike crystals may be utilized to react to a particular direction if desired or coupled with various ball arrangements to be reactive singly to forces in any direction. Such a system has the ability to provide ballistically fired projectiles with an always reactive functioning capability on impacts ranging from a 0° graze type to a head-on nose impact.

4. The system of the present invention is also adaptable to a much wider range of application than the stored energy type power supplies. Since the spark gap power supply requires only the application of a force to generate and switch the energy, this concept can be applied to static applications as well, such as mines, firing devices, booby traps, etc.

5. Another advantage of the system of the present invention over the stored energy type systems, is its inherent safety. In a stored energy system, since the energy is generated and stored upon firing, such a system has the dangerous potential to initiate the explosive train at any time, should some malfunction occur. The spark gap power supply, on the other hand, makes no effort to generate and store energy upon initial firing and any charges that might be generated for one reason or another is immediately drained off through a bleeder resistor. The application of a load on impact creates sufficient charge to arc the gap and actuate the fuse. Until that time, the system is electrically inert.

6. In terms of cost, the spark gap system of the present invention offers still another advantage. As there are no moving parts and the spark gap is maintained by an insulator of the desired gap thickness, this system offers great potential for cost saving. In the stored energy concept, critical switch gaps must be controlled by tolerances on individual parts or subassemblies. The switches themselves usually consist of precision beam springs where dimensions and materials are both critical in maintaining the specified responsiveness of the system. The stored energy power supply also presents more assembly and inspection problems than the spark gap concept. The assembly of the spark gap power supply is relatively simple.

7. The fact that the spark gap system has no moving parts that can malfunction, and is not affected to any degree by material variation for proper operation and does not depend to any great degree on the adherence to precision or tight tolerances, makes the system more reliable and less susceptible to wide variations in its functioning results.

8. Unlike the stored energy power supplies which must maintain a hermetic seal to assure proper operation, and batteries which have limited storage life, the spark gap power supply is not appreciably affected by prolonged storage. Since the system stores no energy there are no leakage problems or corrosion problems such as those experienced with batteries.

Figure 8:
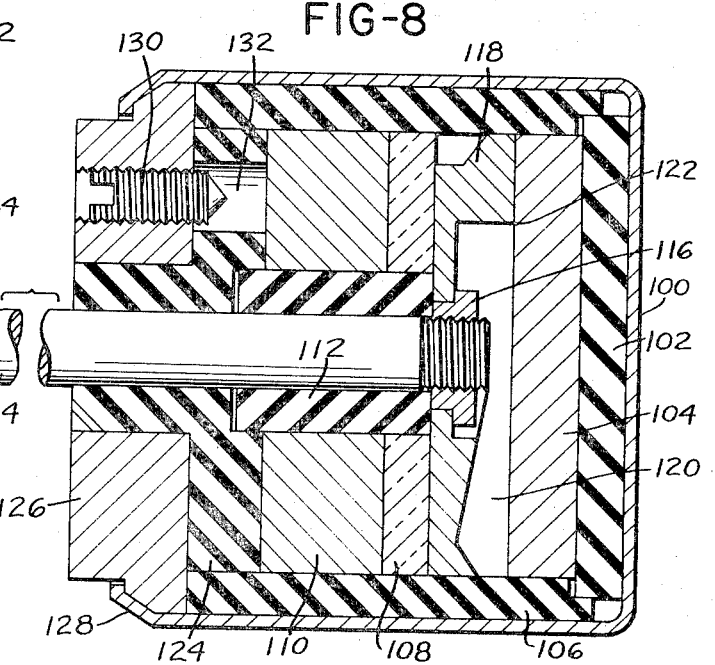
FIG. 8 is another section similar to FIG. 2 and showing a still further modified arrangement of the power supply.

Other piezoid electric crystal spark gap controlled power supplies are schematically illustrated in FIGS. 7 and 8. In FIG. 7 a plug member 70 has a cavity therein with an insulating washer 72 at the bottom against which rests a metal ram member 74. A disc type piezoelectric crystal, or piezoid, 76 engages one side of the ram and on the opposite side of the piezoid is a metal contact plate 78. An insulating sleeve 80 surrounds the ram and piezoid and contact plate and a further insulating disc 82 is arranged on the opposite side of contact plate 78 from piezoid 76. A nut 84 clamps the aforementioned parts in place in the cavity in member 70.

An insulating plug 86 is provided in the center of nut 84 and this plug is provided with a central hole through which a contact screw 88 extends into threaded engagement with contact plate 78. A contact element 90 is secured to screw 88 and this provides means for making electrical connection to contact plate 78. The spark gap is indicated at 92 and it is defined by insulating washer or disc 72. No ring-type piezoid is included in the organization of FIG. 7.

In FIG. 8 a metal shell or case 100 is provided and in the bottom thereof is an insulator disc 102. Adjacent insulator disc 102 is a metal ram 104. An elongated insulating sleeve 106 is provided in shell 100 and inside which ram 104 is located. In spaced relation to ram 104 is a piezoid 108 and the side thereof opposite ram 104 is engaged by the metallic ram member 110. Inside ram 110 and piezoid 108 is an insulating sleeve 112 through which extends a contact pin 114. The contact pin on the ram side of the piezoid 108 is connected by a nut 116 to a metallic member 118 which is disposed between piezoid 108 and ram 104. The member 118 has a relieved portion 120 so that the ram will turn about point 122 upon acceleration thereby to develop a high pressure on the piezoid.

On the opposite side of anvil 110 from piezoid 108 is an insulating member 124 through which contact pin 114 extends. A metal terminal member 126 is held in the mouth end of case 100 by the spun in portion 128 of the case and holds the above described parts in assembled relation. A set screw 130 threaded in member 126 extends into a hole 132 provided in member 124 and defines the spark gap for the power supply. Upon acceleration of the described assembly a voltage is generated between member 126 and contact pin 114 and the spark gap determined by set screw 130 and anvil 110 is in series therewith.

All of the systems described above are characterized in the use of one or more piezoelectric crystals and ram and anvil combinations for subjecting the crystals to pressure. One condition which develops pressure on the crystals is acceleration. It will be understood that acceleration is intended to mean either positive acceleration such as occurs when a projectile was fired from the barrel of the gun, or negative acceleration such as occurs when the projectile impacts against a target.

In each case, the power supply includes a controlling spark gap which insures that the voltage developed on the piezoelectric crystal means will be substantial and thus adequate for certain firing of the fuse of the projectile.

As mentioned previously, a feature that is disclosed herein, that is particularly advantageous for land mines and the like, is the arrangement for applying intense force to the piezoelectric crystal means. This feature permits rather large voltages to be developed by simple trigger mechanisms and the like, such as might be found in land mines and other stationary explosive devices.

Modifications and adaptations of the invention other than those illustrated and falling within the scope of the appended claims will occur to those skilled in the art.

We claim:

1. A power supply for an explosive device having an electrically actuated fuse comprising: piezoid means in said device, means for developing pressure on a localized region of said piezoid means in response to a force exerted on said device in at least one of angularly related directions, a circuit connecting said power supply to said electrically actuated fuse, a spark gap in said circuit, and bleeder resistor means connected in parallel with said piezoid means.

2. A power supply according to claim 1 in which said piezoid means includes a disclike piezoid and a ringlike piezoid, said device comprising an artillery projectile, and said means for developing pressure on said piezoid means including anvil means operable upon acceleration of said projectile to develop pressure on at least one of said piezoids.

3. A power supply according to claim 1 in which said piezoid means includes a disclike piezoelectric crystal, said means for developing pressure on said crystal comprising a metal ram on one side of said crystal and a metal anvil on the other side of said crystal, means electrically insulating said ram and anvil from each other, metal housing means enclosing said crystal and anvil and ram and insulating means and having a first connection leading to one of said ram and anvil, a terminal leading into said housing and insulated therefrom and having a second connection leading to the other of said ram and anvil, said first connection comprising a screw carried by said housing and adjustable therein, said screw being spaced from said one of said ram and anvil and forming a spark gap in said one connection.

4. A power supply according to claim 2 in which said piezoids are arranged in coaxial relation, said anvil means being in the form of a block engaging one face of said disclike piezoid and located inside said ringlike piezoid, peripheral notches in the periphery of said block on the side facing said disclike piezoid, and balls in said notches operable for exerting localized forces on said piezoids upon acceleration of said projectile.

5. A power supply according to claim 4 which includes a bleeder resistor in parallel with said fuse.

6. A power supply according to claim 5 which includes an arming switch in circuit with said fuse and having a first position wherein the fuse is operatively disconnected from said circuit and a second position wherein the fuse is operatively connected to said circuit.

7. A power supply according to claim 6 in which said switch when in said first position shunts across said fuse and moves to said second position only after the projectile has left the barrel of the gun from which it is fired.

8. A power supply according to claim 1 which includes an arming switch having one position wherein it bypasses said fuse and a second position wherein it is in series with said fuse.